April 13, 1954     E. WALDER     2,674,937
ELECTRIC TOASTER
Filed Jan. 15, 1951
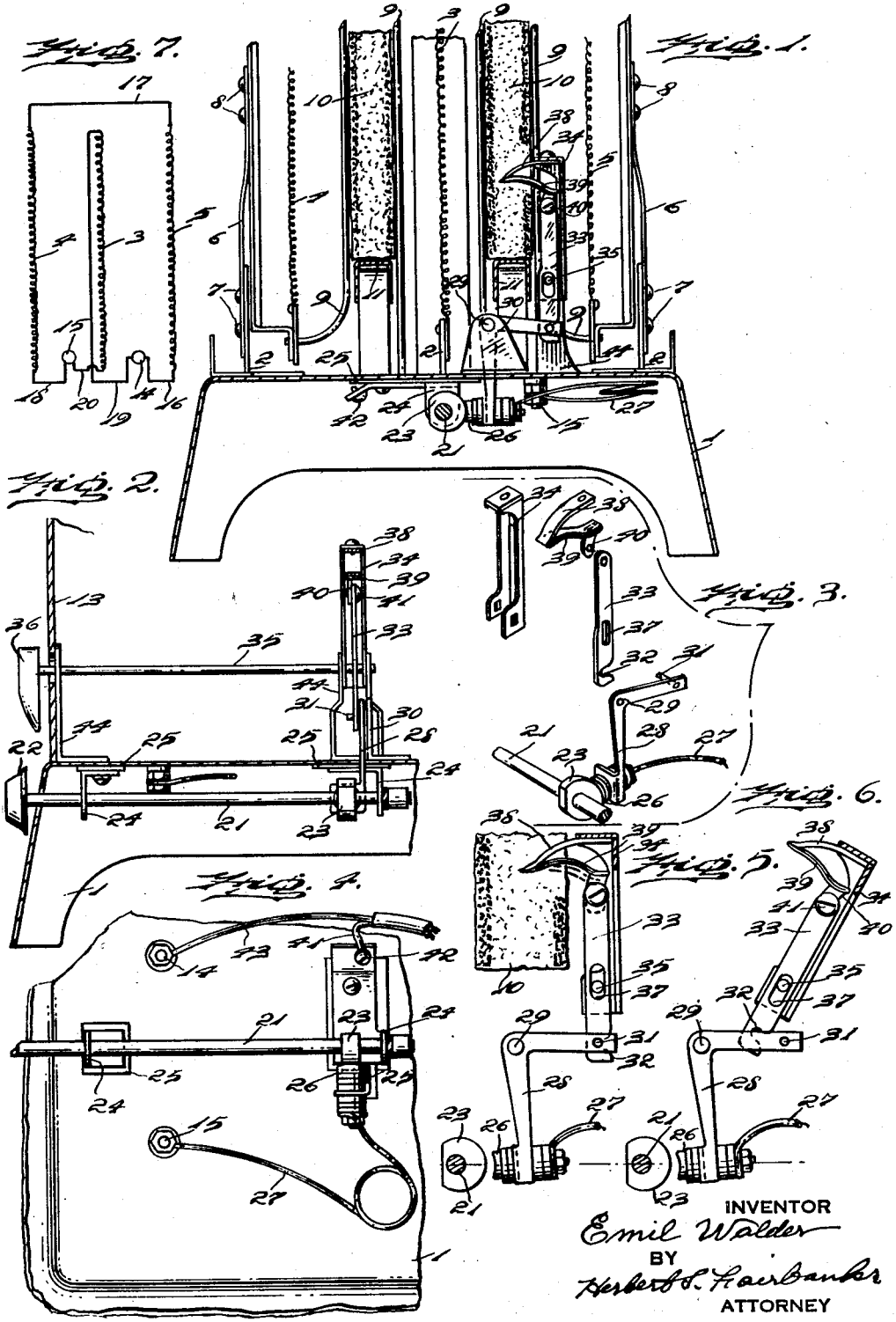
INVENTOR
Emil Walder
BY
Herbert F. Fairbanks
ATTORNEY Patented Apr. 13, 1954

2,674,937

UNITED STATES PATENT OFFICE 2,674,937

ELECTRIC TOASTER

Emil Walder, Philadelphia, Pa.

Application January 15, 1951, Serial No. 206,057

4 Claims. (Cl. 99—331)

It has heretofore been proposed in the design and manufacture of electric bread toasters to utilize the surface temperature of the slice of bread being toasted to control the electric circuit for the electric heating unit of the toaster. This did not enable one to uniformly toast successive slices of bread.

A large proportion of the bread now being sold is in sliced form, which results in a slice having a greater moisture content at the center of the slice. This also holds true in slices of bread cut from a solid loaf.

I have found as a result of numerous experiments that the moisture content at the center of a slice of bread can be utilized to accurately control the opening of the electric circuit for the heating unit so that the proper toasting time interval will be used for slices of bread varying in moisture and thickness, so that each successive slice of toast will be uniformly toasted on both sides.

This can be advantageously accomplished by having the heat responsive element pierce the slice of bread and extend into proximity to the center of the slice.

A further object of the invention is to provide novel means for retaining slices of bread in toasting position, so that the slices which vary in thickness will be uniformly toasted.

A further object of the invention is to devise a novel and simplified construction of heat controlling mechanism.

With the foregoing and other objects in view which will hereinafter clearly appear, my invention comprehends a novel electric toaster.

It further comprehends novel heat controlling mechanism, controlled in a novel manner by the varying moisture at the central portion of a slice of bread; and novel toast retaining means.

Other novel features of construction and advantage will hereinafter more clearly appear in the detailed description and the appended claims.

For the purpose of illustrating the invention, I have shown in the accompanying drawings a typical embodiment of it which in practice will give satisfactory and reliable results. It is, however, to be understood that the various instrumentalities of which the invention consists can be variously arranged and organized and the invention is not limited to the exact arrangement and organization of these instrumentalities except by the scope of the appended claims.

Figure 1 is a sectional elevation of an electric bread toaster embodying my invention.

Figure 2 is a side elevation, partly in section.

Figure 3 is an exploded view of the heat control mechanism for the electric circuits of the heating units.

Figure 4 is a bottom plan view of a portion of the toaster.

Figure 5 is a detail of the heat control in toasting position.

Figure 6 is a detail of the heat control when out of toasting position.

Figure 7 is a wiring diagram for the heating units.

Similar numerals of reference indicate corresponding parts.

Referring to the drawings:

1 designates the base of an electric heater embodying my invention.

For convenience of description, I will describe the construction as arranged for the toasting of slices of bread, but it is to be understood that it is within the spirit and scope of the invention to heat, toast or cook any desired article.

The heating unit can be arranged to receive any desired number of slices or articles, and I have shown a two slice toaster. The base has rising from it brackets 2 which may be of insulating material and carry the sections of the heating unit.

A central section 3 is fixed to the center bracket of the brackets 2. The frames of the side sections 4 and 5 are yieldingly mounted to accommodate slices of different thicknesses. Each of such frames has a flat spring 6 fixed to its respective bracket 2 by fastening devices 7 at its lower end and fixed at its upper end to the frame by fastening devices 8. Each of the frames have the conventional wires 9 to space the slice from the resistance wire which forms the heating element. The slices rest on ejecting members 12 operated in any desired manner.

A casing 13 of any desired contour encloses the heating unit and has the conventional top openings through which the slices are inserted and removed.

The base has terminals 14 and 15, insulated therefrom. As seen in Figure 7, the terminal 14 is connected by line 16 to a heating element 5 which is connected by line 17 with heating element 4. The heating element 4 is connected by line 18 with terminal 15. The terminal 14 is connected by line 19 with heating element 3 and such element 3 is connected by line 20 with binding post 15. It will thus be clear that the heating elements are connected in series.

A rod 21 is rotatably mounted on the base and has a grasping handle 22. This rod 21 carries an eccentric or cam 23 which forms a stationary but adjustable contact. The mounting for the rod is insulated from the base in any desired manner and as shown in Figure 2 the brackets 24 are insulated at 25.

The movable contact 26 is connected by a conductor 27 which is provided with a coil so that it acts as a spring. A lever 28 in the form of an elbow lever has one end connected with the movable contact 26 and is pivoted at 29 in brackets 30 insulated from the base or of insulating material. The upper arm of the lever 28 has a pin 31 adapted to be received in the U shaped slot 32 at the lower end of a link 33. The edges at the open end of the slot are preferably rounded as shown.

The link 33 is movably mounted within a mounting 34, which, as shown, is of channel formation and fixed at its lower end to a rod 35 having a grasping handle 36 exterior of the casing. This rod 35 passes through a slot 37 in the link 33. The upper end of the channel of the mounting 34 is closed and has fixed to it a rigid member 38 which extends laterally from the mounting and preferably curves downwardly. This member is preferably of Monel metal.

A heat responsive element 39 is fixed to the forward or outer end of the member 38 and at its rear end has a downwardly extending arm 40 pivoted at 41 to the upper end of the link 33.

The bracket 24 at the end which carries the eccentric 23 has a conductor 41 connected to it as at 42. The other conductor 43 is connected with the binding post 14. The conductors 41 and 43 are adapted to be connected in the usual manner with a source of electric supply.

The operation will now be apparent to those skilled in this art and is as follows:

The operator partially rotates the rod 24 to adjust the position of the stationary contact 23 for a light, medium or brown toasting action.

The slices of the article to be toasted are placed between the heating elements to rest on the ejector members 11. The operator now partially rotates the rod 35 which turns the mounting or carrier 34 from the position seen in Figure 6 into that seen in Figure 5. This causes the rigid member 38 and the heat responsive element 39 to pierce the toast so that their forward ends are substantially centrally of the slice or in other words about midway between opposite faces of the slice.

As the mounting is turned into toasting position as seen in Figure 1 and as shown in dotted lines in Figure 5, the walls of the slot 32 engaging the pin 31 rocks the lever 28 to move the movable contact 26 into engagement with the stationary contact 23 so that the electric circuit will be closed through the heating unit and the toasting action on the slice begins. The moisture at the central portion of the slice will retain the heat responsive element in a cool condition until the temperature intermediate opposite faces of a slice increases to such a degree that the heat responsive element is affected by such temperature. The heat responsive element 39 will move from the position seen in dotted lines in Figure 5 to that seen in full lines in Figure 5. This rocks the lever 28 in a direction to move the movable contact 26 out of engagement with the stationary contact 23 as shown in Figure 5, and the electric circuit for the heating element will be opened.

The operator now turns the shaft 35 to bring the parts into the position seen in Figure 6 and the toast is ready to be removed from the toaster.

Having thus described my invention, what I claim and desire to secure by Letters Patent is:

1. In an electric bread toaster, means to retain a slice of bread in toasting position, an electric heating unit, and a heat control for said unit comprising relatively movable contacts, a mounting having a laterally extending member which is rigid under heat from said unit, a heat responsive element having one end fixed to said member, a link carried by the mounting and connected with the other end of said element, a lever connected with one of said contacts and having a pin and slot connection with said link, and means to move said mounting to cause said member and element to pass into or out of a slice of bread when the bread is in toasting position said means comprising a manually actuated member fixed at one end to said mounting.

2. In an electric bread toaster, means to retain a slice of bread in toasting position, a channelled member positioned at one side of said means, a rigid member fixed to the upper end of said channelled member and extending laterally therefrom, a heat responsive member fixed at one end to an end of said rigid member, a lever within the channel of said channelled member and linked at one end to an end of the heat responsive member and having an open slot at its other end, an elbow lever having a pin to enter said slot, a contact carried by said elbow lever, a manually adjustable contact cooperating with the elbow lever contact, and a manually actuated member rotatably mounted and fixed to said channelled member to move it and thereby said heat responsive member into toasting position.

3. The construction defined in claim 2 wherein the elbow lever is spring tensioned and the expansion of the heat responsive member releases the slot and pin connection with said elbow lever.

4. In an electric toaster, means to retain the article to be toasted in toasting position, a channelled member, a laterally extending rigid member connected at one end to the upper end of said channelled member, a heat responsive member having one end fixed to said rigid member, a lever linked to one end of said heat responsive member having a closed and an open slot, an elbow lever having a pin to enter said open slot, a movable contact for said elbow lever, a manually actuated contact cooperating with the movable contact, and a manually actuated member rotatably mounted, passing through said closed slot and fixed to said channelled member to move it and thereby the heat responsive element into toasting position, and the expansion to a predetermined degree of said heat responsive member moving said lever to release the pin and slot connection with said elbow lever.

References Cited in the file of this patent

UNITED STATES PATENTS

| Number | Name | Date |
| --- | --- | --- |
| 1,957,343 | Hurxthal et al. | May 1, 1934 |
| 1,984,063 | Graham | Dec. 11, 1934 |
| 2,036,210 | Graham | Apr. 7, 1936 |
| 2,038,361 | Hawes | Apr. 21, 1936 |
| 2,099,210 | Ireland | Nov. 16, 1937 |
| 2,103,513 | Campbell | Dec. 28, 1937 |
| 2,274,325 | Ford | Feb. 24, 1942 |
| 2,287,956 | Aff | June 30, 1942 |
| 2,459,169 | Koci | Jan. 18, 1949 |